Patented Feb. 22, 1938

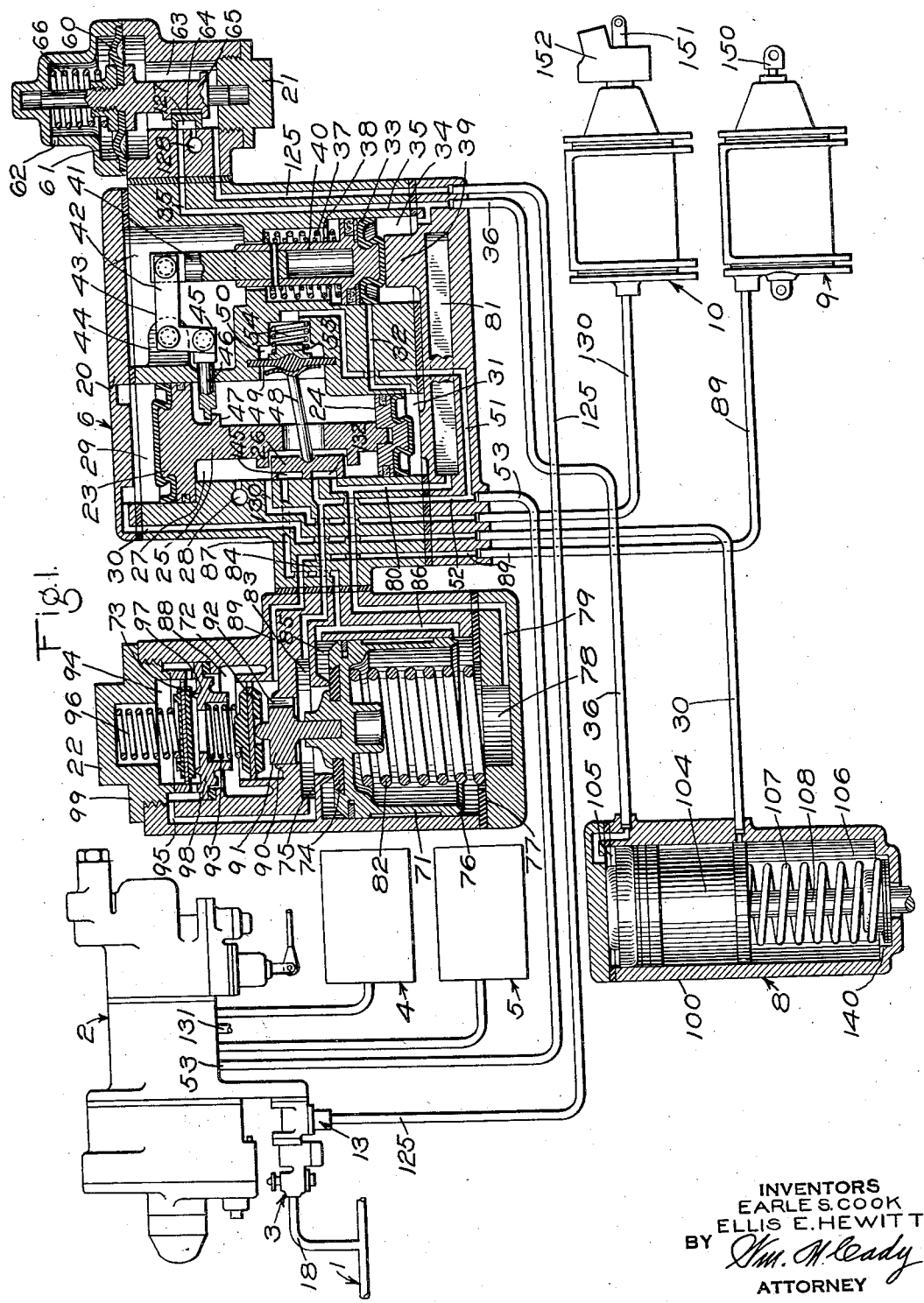
Feb. 22, 1938.  E. S. COOK ET AL  2,109,366
EMPTY AND LOAD BRAKE
Original Filed Nov. 27, 1935  2 Sheets-Sheet 1
INVENTORS
EARLE S. COOK
ELLIS E. HEWITT
BY *Wm. W. Cady*
ATTORNEY

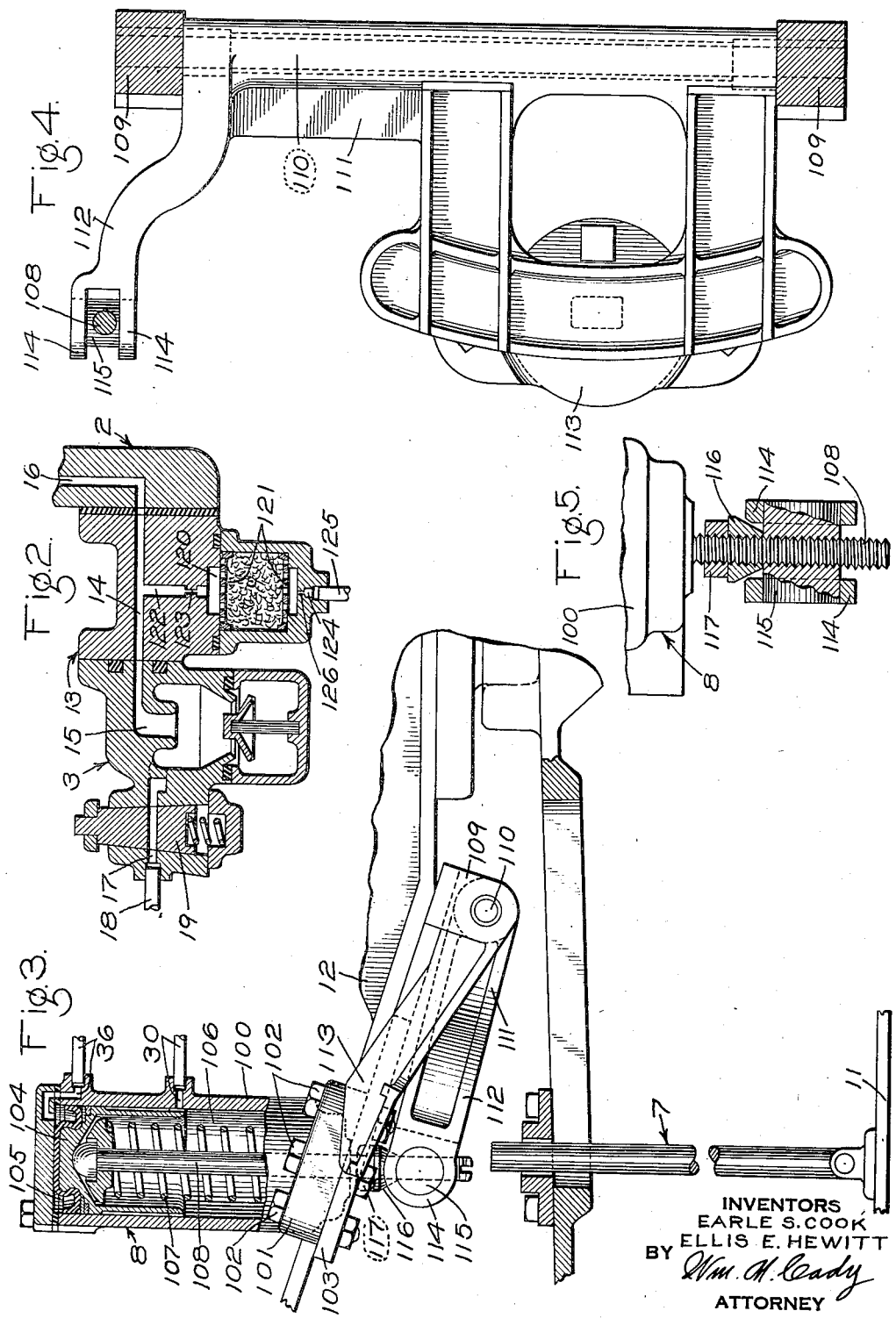

2,109,366

UNITED STATES PATENT OFFICE 2,109,366

EMPTY AND LOAD BRAKE

Earle S. Cook, Wilkinsburg, and Ellis E. Hewitt, Edgewood, Pa., assignors to The Westinghouse Air Brake Company, Wilmerding, Pa., a corporation of Pennsylvania Application November 27, 1935, Serial No. 51,798
Renewed October 11, 1937

41 Claims. (Cl. 303—22)

This invention relates to empty and load brake equipment for vehicles and more particularly to a fluid pressure empty and load brake equipment of the type which is adapted to be automatically changed over or conditioned for either empty or load braking according to variations in the weight of the lading carried by the vehicle.

The principal object of the invention is to provide an improved empty and load brake equipment of the above mentioned type.

Another object of the invention is to provide a fluid pressure empty and load brake equipment in which a standard brake controlling valve device, such for instance as the "AB" brake controlling valve device, which has been designed for a single capacity fluid pressure brake equipment, may be employed without any change in either the construction or operating characteristics of the device.

Another object of the invention is to provide an empty and load brake apparatus which may readily and economically be combined with a single capacity fluid pressure brake equipment to convert such equipment into an empty and load brake equipment.

This object is attained by interposing the empty and load brake apparatus in the usual brake cylinder supply and release communication leading from the brake controlling valve device of a single capacity brake equipment, by providing a control communication from the brake pipe to the empty and load brake apparatus, and by employing a brake cylinder arrangement, comprising an empty brake cylinder and a load brake cylinder having the usual push rod and cooperating clutch mechanism, in place of a single brake cylinder.

A further object of the invention is to provide a fluid pressure empty and load brake equipment which, when the brake pipe is being increased in charging, will be automatically conditioned or changed over for either empty or load braking, depending upon the weight carried by the body of the vehicle, and which, when the brake pipe pressure exceeds a predetermined limit, will be maintained in its conditioned state so long as the brake pipe pressure is not reduced below said predetermined limit, and a further feature resides in the automatically operative means employed for positively locking the conditioning or change-over portion of the apparatus in either of its conditioning positions against accidental movement therefrom and for automatically unlocking said portion to permit its intentional operation from one of its conditioning positions to the other.

Other objects and advantages will appear in the following more detailed description of the invention.

In the accompanying drawings, Fig. 1 is a diagrammatic view, mainly in section, of an empty and load fluid pressure brake equipment constructed in accordance with the invention; Fig. 2 is an enlarged fragmentary sectional view illustrating the manner of connecting the brake pipe and the conditioning or change-over apparatus; Fig. 3 is a fragmentary elevational view, partly in section, illustrating the arrangement of the control strut and strut cylinder mechanism of the equipment on a car truck and the car body, respectively, portions of a truck bolster, a body bolster and a spring plank of the vehicle being shown; Fig. 4 is a plan view, partly in section, of the control arm of the strut cylinder mechanism; and Fig. 5 is a fragmentary view, partly in section and partly in elevation, of an adjusting connection included in the strut cylinder mechanism.

As shown in Fig. 1 of the accompanying drawings, the empty and load fluid pressure brake equipment may comprise a brake pipe 1, a brake controlling valve mechanism 2, a combined cut-out cock and centrifugal dirt collector 3, an auxiliary reservoir 4, an emergency reservoir 5, an empty and load change-over valve mechanism 6, a strut 7, a strut controlled cylinder mechanism 8, an empty brake cylinder device 9 and a load brake cylinder device 10, the strut 7 being mounted on the spring plank 11 of a truck of the vehicle or any other suitable truck part which is not permitted to move vertically relative to the truck wheels, and the other above enumerated devices and mechanisms being mounted on the body of the vehicle preferably on a body bolster 12.

The brake controlling valve mechanism 2 shown is of the "AB" type but may be of any other desired type. This mechanism may be of substantially the same construction and have the same operating characteristics as the "AB" valve mechanism fully described in the patent to Clyde C. Farmer, No. 2,031,213, issued February 18, 1936 and in view of this it is deemed unnecessary to show and describe the mechanism in detail. It will of course be understood that this mechanism operates upon a service reduction in brake pipe pressure to supply fluid under pressure to effect a service application of the brakes, upon an emergency reduction in brake pipe pressure to supply fluid under pressure to effect an emergency application of the brakes and upon an increase in brake pipe pressure to effect a release of the brakes and the charging of the brake equipment.

Clamped between the casing of the brake controlling valve mechanism 2 and the combined cut-out cock and centrifugal dirt collector device 3 is a branch pipe T or filler piece 13 having a brake pipe passage 14 which, at one end, registers with the outlet passage 15 of the device 3 and, at the other end, with the brake pipe passage 16 of the brake controlling valve mechanism, which latter passage, as is well known, being in constant open communication with the usual emergency and triple valve piston chambers (not shown). The inlet passage 17 of the device 3 is connected by a branch pipe 18 to the brake pipe 1, which passage is normally open to the passage 15, but which is adapted to be closed through the medium of the rotatable cut-out plug valve 19.

The change-over valve mechanism 6 comprises an empty and load change-over valve device 20 which functions to condition the equipment for either empty or load braking, a change-over control valve device 21 which functions to control the operation of the strut cylinder mechanism 8 and to effect the operation of the change-over valve device to its load braking position and to render the change-over valve device inoperative from one change-over position to the other so long as the brake pipe pressure is in excess of a predetermined limit, and further comprises a brake cylinder control valve device 22 which controls the flow of fluid to and the flow of fluid from the brake cylinder devices 9 and 10, all of which will be hereinafter more fully described.

The change-over valve device 20 comprises a casing in which there are operatively mounted differential pistons 23 and 24 which are rigidly connected together by means of a stem 25 which is adapted to operate a change-over slide valve 26 contained in a chamber 27 located between the pistons and connected through a passage 28 to the atmosphere. The piston 23 is of greater diameter than the piston 24 and at its outer face there is a chamber 29 which, as will hereinafter more fully appear, is connected through a passage and pipe 30 to the strut controlled cylinder mechanism 8. At the outer face of the smaller piston 24 there is a chamber 31 which is connected to a passage 32 and which is adapted to be controlled by a piston valve 33. At one side of the piston valve 33 there is a chamber 34 which is connected to a control passage 35 leading to the change-over control valve device 21, said passage being also connected to a pipe 36 leading to the strut cylinder mechanism 8. At the other side of the piston valve 33 and interposed between and engaging the piston valve are springs 37 and 38 which, at all times, tend to urge the piston valve 33 toward a stop 39 which, in the present embodiment of the invention, is integral with the casing, said stop, as shown in Fig. 1, being adapted to limit the outward travel of the piston valve.

The piston valve 33 is provided with a hollow stem 40 which is slidably guided in the casing and which at its outer end has secured thereto an extension 41. The outer end of this extension is operatively connected to the arm 42 of a bell-crank lever 43 pivotally carried by a bracket 44 which may be integral with the casing, the other arm 45 of the lever being operatively connected to one end of a locking bolt or member 46 slidably mounted in the casing. This locking member extends into the change-over valve chamber 27 and is adapted to engage with a lug 47 carried by the stem 25, to lock the stem against movement as will hereinafter more fully appear.

Contained in the change-over slide valve chamber 27 is a loading strut 48 which, at one end pivotally engages the rear face of the change-over slide valve 26 within a suitable recess provided in the valve, and which, at its other end, rockably contacts with one side of a flexible diaphragm 49 mounted in the casing. At the other side of the diaphragm 49 there is a chamber 50 which is connected through a passage 51, a passage 52 and a pipe 53 to the usual brake cylinder supply and exhaust passage of the brake controlling valve device 2. Contained in the chamber 50 is a spring 54 which is interposed between and engages the casing and a follower 55 in engagement with the diaphragm 49. The purpose of the spring 54 is to maintain the strut in close engagement with the change-over slide valve and the slide valve in engagement with its seat against unintentional vibration but is not intended to load the valve to any appreciable extent, the loading being accomplished by means of fluid under pressure which is adapted to be supplied to the diaphragm chamber 49 all of which will appear in the following description of the operation of the equipment.

The change-over control valve device 21 may comprise a casing in which there is mounted a flexible diaphragm 60, at one side of which diaphragm there is a chamber 61 which is constantly connected through a passage 62 with the atmosphere and at the opposite side of which there is a valve chamber 63 containing a slide valve 64 which is adapted to be operated by a stem or follower 65 operatively secured to the flexible diaphragm. Contained in the chamber 61 is a spring 66 which, at all times, is adapted to urge the diaphragm, stem and slide valve toward the position in which they are shown in Fig. 1.

The transfer or brake cylinder pressure build up and release control valve device 22 comprises a load brake cylinder control valve piston 71, an empty brake cylinder control valve 72 and a brake cylinder release control valve 73. The load brake cylinder control valve piston 71, on one side, is provided with a gasket 74 which is adapted to engage a seat rib 75 carried by the casing, and at the other side is provided with an annular valve 76 adapted to engage a gasket 77 mounted in the casing. At this latter side of the valve piston there is a chamber 78 which is in constant open communication with a passage 79 which is connected to a passage 80 leading to the seat for the change-over slide valve 26 and to a volume reservoir 81, which reservoir, in the present embodiment of the invention, is defined by the casing. Contained in the chamber 78 and interposed between and engaging the valve piston and the casing is a spring 82 which acts to normally maintain the valve piston in the position in which it is shown in Fig. 1. With the valve piston in this position the valve 76 is out of engagement with the gasket 77 and the gasket 74 is in seating engagement with the seat rib 75, the portion of the gasket side of the piston which is surrounded by the seat rib 75 being exposed to a chamber 83 which is connected through a passage 84 to the brake cylinder supply and release passage 52, the remaining portion of this side of the piston being exposed to a chamber 85 which is connected through connected passages 86 and 87 to the seat for the change-over slide valve 26. With the valve 76 out of engagement with the gasket 77 as shown in Fig. 1, the chamber 78 at the spring side of the valve piston is connected to the passage 86.

The control valve 72 is contained in a chamber 88 which is connected through a passage and pipe 89 to the empty brake cylinder 9 and which is adapted to be moved into and out of seating engagement with an annular seat rib 90 to control communication between the chambers 88 and 83. As shown in Fig. 1, the valve 72 is normally maintained out of engagement with the seat rib 90 by means of the spring 82 acting through the medium of the valve piston 71 and a stem 91 carried by and extending outwardly from the valve piston. The stem 91 is provided with a groove or opening 92 through which the chambers 83 and 88 are connected together when the valve 72 is unseated. Contained in the chamber 88 is a light spring 93 which, at all times, tends to urge the valve in the direction toward the seat rib 90.

The release control valve 73 is contained in a chamber 94 which is connected through a passage 95 to the chamber 83 and is adapted to control communication between the valve chambers 88 and 94. The valve 73 is subjected to the pressure of spring 96 which acts to normally maintain the valve seated on an annular seat rib 97 carried by a bushing 98 clamped to the casing by means of a cap nut 99 which has screw-threaded connection with the casing, said cap nut serving as a seat for one end of the spring 96.

The strut cylinder mechanism 8 may comprise a vertically disposed cylinder casing 100 having at each side a lug 101 which is secured by means of bolts 102 or the like to a bracket 103 rigidly carried by the body bolster 12 of the vehicle. Contained in the cylinder casing is a piston 104 having at one side a chamber 105 which is in constant communication with the pipe 36 and having at the other side a chamber 106 which is constantly connected to the atmosphere by way of clearance space which may be provided between the non-pressure head of the cylinder and a push rod 108 rotatably secured to the piston. Contained in the non-pressure chamber 106 is a coil spring 107 which, at all times, tends to move the strut cylinder piston 104 to its normal or inner position in which it is shown in Fig. 3. With the piston 104 in this position the pipe 30 is connected to the chamber 106 and consequently to the atmosphere.

The bracket 103 is provided with spaced downwardly depending lugs 109 which support a hinge pin or bolt 110 upon which a lever member 111 is rockably mounted. The member 111 is provided with an operating arm 112 and a control arm 113, the operating arm being operatively and adjustably connected with the outer end of the push rod 108 of the strut cylinder device. The control arm 113 is adapted to be moved into contact with the strut 7 carried by the truck spring plank 11 to limit the outward movement of the piston 104 according to the weight carried by the car body.

In the present embodiment of the invention the outer end of the arm 113 is bifurcated to provide spaced portions 114 in which a pin 115 is rockably mounted. The outer end portion of the push rod 108 extends through an opening in the pin 115 and, within said opening, has screw-threaded connection with the pin. Between the pin 115 and the adjacent end of the cylinder casing is a nut 116 having screw-threaded connection with the push rod which nut is adapted to be turned down between the spaced portion 114 of the arm 113 into holding engagement with the outer surface of the pin 115, said nut being held against accidental rotation by a lock nut 117. This construction provides for adjustment of the arm 113 relative to the strut 7 carried by the spring plank of the car truck.

In most instances the empty and load change-over apparatus will be so adjusted as to assume load position when the car is loaded to slightly more than half of its capacity and to assume empty position when the car is loaded to less than half of its capacity. To make such an adjustment the nuts 116 and 117 of the strut cylinder mechanism 8 are first slacked back and then the push rod 8 and piston 104 are pulled outwardly until these parts are brought to a stop by the piston engaging an annular stop shoulder 140 on the cylinder casing 100. If, when the piston engages the stop shoulder 140, the arm 113 of the member 111 does not engage the upper end of the strut 7, the push rod 108 is rotated in a counter-clockwise direction until it does. When the adjustment has been made the nuts 116 and 117 are again turned down to their securing position. If the arm 113 should engage the strut before the piston has engaged the stop shoulder 140, the push rod 108 is rotated in a clockwise direction until it has engaged the piston. When the strut cylinder is thus adjusted it will function to assume either empty or load position according to the range of loads above specified. It will however be understood that if desired the apparatus may be adjusted to make the change-over under any other desired range of loads without making any changes in the construction or arrangement of the several parts of the apparatus.

The filler piece 13 which is clamped between the casing of the brake controlling valve device 2 and the combined cut-out cock and dirt collector as hereinbefore described is provided with a removable strainer device comprising a casing having a chamber 120 containing a strainer which may be of any desired construction but which, as shown, may consist of perforated members 121 between which curled hair or any other desired straining material is packed. The chamber 120 is connected with the brake pipe passage 14 through a branch passage 122 in which there is a choke 123 and is also connected through a passage 124 and a pipe and passage 125 to the slide valve chamber 63 of the change-over control valve device 21, the passage 124 having a choke 126 interposed therein.

The empty and load brake cylinder devices 9 and 10, respectively, may each be of the usual well known construction and may be arranged in the usual well known manner to actuate a brake cylinder lever (not shown), and in view of this a detailed description of the construction and operation of these devices is deemed unnecessary, however, the operation of these brake cylinder devices will be briefly described in connection with a load application of the brakes.

According to the invention, the equipment is adapted to be conditioned for either empty or load service when the equipment is being initially charged with fluid under pressure as will hereinafter more fully appear in the following description of the operation of the equipment.

*Change-over operation of the equipment on an empty car*

Assuming the equipment to be at atmospheric pressure, the slide valve 64 of the change-over control valve device 21 will not be in the position in which it is shown in Fig. 1 but will be in its innermost position in which the passage 35 is connected to the slide valve chamber 63, said valve being maintained in this position by the spring 66 acting through the medium of the diaphragm 60 and stem 65.

In initially charging the equipment, fluid under pressure supplied to the brake pipe 1 flows through branch pipe 18, passages 17, 15 and 14 to the passage 16 and from thence flows to the several chambers of the brake controlling valve device which are to be charged and to the auxiliary and emergency reservoirs 4 and 5, respectively, in the usual manner.

Fluid under pressure flows from the passage 14 in the filler piece 13 to the slide valve chamber 63 of the change-over control valve device 21 by way of choked passage 122, chamber 120 and strainer, choked passage 124 and pipe and passage 125. With the change-over control slide valve 64 in its innermost position, fluid under pressure flows from the valve chamber 63 to passage 35 and from thence to the latch piston valve chamber 34 and to the strut piston chamber 105 by way of pipe 36 which is connected to the passage 35. When the pressure of fluid in the piston chamber 105 has been increased to about thirteen pounds the piston 104 and thereby the push rod 108 will be caused to move downwardly against the opposing pressure of the spring 107. The push rod as it is thus moved causes the member 111 to be rocked in a counter-clockwise direction on the hinge pin 110 until the member is stopped by its engagement with the end of the strut 7.

Since the car is empty, the strut piston 104 will have moved far enough to connect the passage 30 to the chamber 105 before the arm 113 of the member 111 is brought to a stop by the strut 7. Fluid under pressure now flows from the strut piston chamber 104 through pipe and passage 30 to the piston chamber 29 of the change-over valve device 20.

When the pressure of fluid in the piston chamber 34 has been increased to about twenty pounds the piston valve 33 will be caused to move inwardly against the opposing pressures of the springs 37 and 38. As the valve piston is thus moved it uncovers the passage 32 and fluid under pressure flows from chamber 34 through this passage to the piston chamber 31 of the change-over valve device. Further, as the valve piston is thus moved it causes the bell crank lever 43 to be rocked in a counter-clockwise direction. The bell crank lever, as it is thus actuated, draws the locking bolt 46 out of locking engagement with the lug 47 on the piston stem 25. If the change-over valve device 6 happens to be in load position when the locking bolt 46 is moved out of engagement with the lug 47, the fluid pressure in the piston chamber 29 acting on the face of the larger piston 23 will of course move the piston assemblage and slide valve 26 to empty position against the opposing fluid pressure in the chamber 31 acting on the face of the smaller piston. Should the piston assemblage and slide valve 26 be in empty position as shown in Fig. 1 when the locking bolt is drawn to its unlocking position there will, of course be no movement of these parts.

Now when the pressure of fluid in the valve chamber 63 of the change-over control valve has been increased to around thirty pounds, the diaphragm 60 will be caused to flex upwardly against the opposing pressure of the spring 66, said diaphragm as it is thus flexed acting through the medium of the stem 65 to shift the slide valve 64 outwardly to the position in which it is shown in Fig. 1, in which position a cavity 127 in the valve connects the passage 35 to a passage 128 which leads to the atmosphere. With this connection thus established, fluid under pressure flows from the connected piston chambers 31 and 34 and the piston chamber 105 of the strut cylinder device to the atmosphere. When, due to this flow, the pressure in piston chamber 34 has reduced to slightly less than the pressures of the springs 37 and 38 (twenty pounds), said springs act to shift the piston valve 33 outwardly into engagement with the stop 39, in which position the valve piston closes the passage 32. The valve piston, as it is thus moved, actuates the bell crank lever 43 to advance the locking bolt 46 into locking relation with the lug 47 carried by the piston stem 25, thus locking the pistons 23 and 24, stem 25 and slide valve 26 in empty position as shown in Fig. 1. When, due to the flow of fluid from the strut piston chamber 105 to the atmosphere, the pressure of fluid in said chamber has reduced to slightly below the value of the spring 107 (thirteen pounds), said spring acts to move the piston 104 to its uppermost position as shown in Fig. 1. The piston after it has moved a short distance toward its uppermost position first cuts off the communication between the piston chamber 105 and passage 30 and then connects the passage 30 to the spring chamber 106 and consequently to the atmosphere, so that fluid under pressure is now vented from the piston chamber 29 of the change-over valve device 6 by way of passage and pipe 30 and spring chamber 106. It will here be noted that the pressure in chamber 29 will reduce to atmospheric pressure and that if there should be any fluid pressure trapped in the piston chamber 31 of the change-over valve device when the piston valve closes the passage 32, the locking bar, having been moved into locking engagement with the lug 47, will prevent such trapped pressure from shifting the pistons 23 and 24 and slide valve 26 from their empty position.

As the piston 104 of the strut cylinder mechanism moves toward its upper position, it causes the lever member 111 to be rocked in a clockwise direction about the hinge pin 110 so that the arm 113 of such member is moved out of engagement with the strut 7 carried by the car truck. When the piston 104 has been moved to its uppermost position the space between the arm 113 and the adjacent end of the strut will be such that the arm and strut will not engage when, due to the usual service vibrations and the swaying of the car body, the distance between the arm and strut change, thus eliminating excessive and unnecessary wear of the several parts of the mechanism and also any possibility of an accidental change in the setting of the apparatus while the car is in service.

With the apparatus in empty position and the several parts in the positions as just described and as shown in Fig. 1, the load brake cylinder 10 is connected to the atmosphere through a pipe and passage 130, slide valve chamber 27 of the change-over valve device 6 and passage 28, and the empty brake cylinder 9 is connected to the atmosphere by way of pipe and passage 89, valve chamber 88 of the brake cylinder control valve device 70, groove 92 in the plunger 91, chamber 83, passages 84 and 52, pipe 53, through the brake controlling valve device 2, pipe 131 and retainer valve device (not shown).

The chamber 78 at the spring side of the load brake cylinder control valve piston 71 is connected to the passage 52 and consequently to the atmosphere by way of passages 79 and 80, and a cavity 132 in the change-over slide valve 26. The volume reservoir is also open to the passage 52 by way of passage 80 and the cavity 132.

*Application of the brakes with the equipment conditioned for empty car operation*

When it is desired to effect an application of the brakes the brake pipe pressure is reduced in the usual manner, causing the brake controlling valve device 2 to function to supply fluid under pressure from the auxiliary reservoir 4 to the pipe 53. Fluid under pressure thus supplied to the pipe 53 flows therefrom to the empty brake cylinder 9 by way of passages 52 and 84, chamber 83 of the brake cylinder control valve device 70, groove 92 in the plunger 91, past the open valve 72, through valve chamber 88 and passage and pipe 89. Fluid under pressure from the passage 52 besides flowing to the empty brake cylinder flows to the chamber 78 at the spring side of the load brake cylinder control piston 71 by way of cavity 132 in the change-over slide valve 26 and passages 80 and 79, and also flows through passage 80 to the volume reservoir 81. From the passage 52 fluid under pressure flows through passage 51 to the diaphragm chamber 50 of the change-over valve device 6. The pressure of fluid in chamber 50 acts through the medium of the diaphragm 49 and strut 48 to maintain the slide valve in close contact with the slide valve seat against the tendency of fluid at brake cylinder pressure in cavity 132 to raise the valve from its seat, thus insuring against leakage of brake cylinder fluid to the valve chamber 27 which is open to the atmosphere.

The pressure of fluid in chamber 78 and the pressure of the spring 82 maintain the valve piston 71 in the position in which it is shown in Fig. 1 against the opposing pressure of fluid in chamber 83 acting over a relatively small portion of the area of the face of the valve piston.

It will be understood that at the present time both the brake controlling valve device and auxiliary reservoir of the "AB" brake equipment is designed for use with a 10" brake cylinder. When these parts are employed in an empty and load equipment an 8" empty brake cylinder will be used instead of a 10" brake cylinder. To insure the same relation of brake cylinder pressure to brake pipe reduction with the 8" brake cylinder as that obtained when the 10" brake cylinder is used in a single capacity equipment, the volume reservoir 81 is provided which compensates for reduced brake cylinder volume.

*Release of the brakes with the equipment conditioned for empty car operation*

When it is desired to effect the release of the brakes, the brake pipe pressure is increased in the usual manner, causing the brake controlling valve device 2 to function to establish communication from the pipe 53 to the pipe 131 which is connected to the atmosphere through the retainer valve device. Fluid under pressure now flows from the empty brake cylinder to the pipe 53 and consequently to the atmosphere by way of pipe and passage 89, valve chamber 88, past the open valve 72, through groove 92 in the plunger 91, chamber 83 and passages 84 and 52, thus effecting the release of the brakes. Fluid under pressure is also vented from the diaphragm chamber 50 by way of passage 51, thus relieving the slide valve 26 of the heavy pressure to which it has been subjected during the application of the brakes.

*Change-over operation of the equipment on a loaded car*

When the car is carrying a load of more than half of its capacity the distance between the outer end of the arm 113 of the member 111 and the upper end of the strut 7, due to the compression of the truck springs, will be such that when fluid under pressure is supplied to the piston chamber 105 of the strut cylinder mechanism 8 in initially charging the equipment, the arm 113 will engage the strut 7 and thereby bring the piston 104 to a stop before it can uncover the port 30 to the chamber 105. The piston 104 in this position will not close communication from the port 30 to the spring chamber 106, so that the piston chamber 29 of the change-over valve device 6 remains connected to the atmosphere.

Now when the pressure of fluid in chamber 34 has been increased to about twenty pounds the piston valve 33 moves inwardly causing the bell crank lever 43 to be actuated to draw the locking bolt 46 out of locking engagement with the lug 47. The piston valve in its traverse uncovers the passage 32 so that fluid under pressure now flows from the chamber 34 to the piston chamber 31. With the piston chamber 29 at atmospheric pressure and the locking bolt out of locking engagement with the lug 47, fluid under pressure in chamber 31, acting on the piston 24, causes the pistons 23 and 24, piston stem 25 and slide valve 26 to be shifted in the direction of the piston 23 from empty position to load position.

When the pressure of fluid in slide valve chamber 63 of the change-over control valve device 21 exceeds thirty pounds the diaphragm 60 flexes and causes the slide valve 64 to be shifted to the position in which it is shown in Fig. 1, in which position the cavity 127 connects the passage 35 to the passage 128 leading to the atmosphere, so that fluid under pressure is vented from the chamber 34 and from the piston chamber 105. With the chamber 34 thus connected to atmosphere, the springs 37 and 38 act to move the piston valve into engagement with the stop 39. The piston valve in its movement toward the stop 39 causing the bell crank lever 43 to operate to move the locking bolt into locking engagement with the lug 47. With the piston chamber 105 vented the spring 107 returns the piston and thereby the arm 113 of the member 111 to their normal position.

With the change-over slide valve in load position, the chamber 78 at the spring side of the valve piston 71 is connected to the atmosphere by way of passages 79 and 80, past one end of the slide valve 26, through slide valve chamber 27 and passage 28. The volume reservoir 81 is also connected to the atmosphere by way of passage 80.

*Application of the brakes with the equipment conditioned for loaded car operation*

In effecting an application of the brakes, fluid under pressure supplied to the pipe 53 by the brake controlling valve device 2, flows through passage 52 and passage 51 to the diaphragm chamber 50 and acts to maintain the slide valve 26 in close engagement with its seat. From the passage 52 fluid under pressure flows to the empty brake cylinder 9 by way of passage 84, chamber 83, groove 92 in the plunger 91, past the open valve 72, through valve chamber 88 and passage and pipe 89.

Now when brake cylinder pressure in chamber 83 and acting on that portion of the face of the piston valve 71 which is encircled by the seat rib 75 has been increased to around twenty pounds the force of the spring 82 will be overcome and the valve piston will start to move down. As soon as the seal between the seat rib 75 and the gasket 74 carried by the valve piston is broken, the entire area of the face of the valve piston is subjected to fluid at brake cylinder pressure and as a consequence it makes the remainder of its traverse with a snap action. The valve piston in its traverse first cuts off communication between the chamber 78 and the passage 86 and then seats the valve 76 on the gasket 77. With the gasket 74 moved out of engagement with the seat rib 75, fluid under pressure flows from the chamber 83 to the load brake cylinder 10 by way of chamber 85, passage 87, a cavity 145 in the change-over slide valve 26 and passage and pipe 130.

It will here be noted that when the valve piston moves and seats the valve 76 on the gasket 77, the light spring 93 acts to seat the valve 72 on the seat rib 90. When the valve 72 is thus seated it prevents the flow of fluid from the empty brake cylinder 9 to the load brake cylinder 10. When the load brake cylinder pressure present in chamber 84 exceeds empty brake cylinder pressure in chamber 88 by about one pound the force of the spring 93 will be overcome and the valve will be unseated, so that fluid under pressure now flows to both the empty and load brake cylinders, building up the pressures in these cylinders together.

It is well known that the push rod 150 of the empty brake cylinder device 9 and the push rod 151 of the load brake cylinder device 10 are both operatively connected to a brake cylinder lever (not shown) and that the load brake cylinder device is provided with a latch mechanism 152 which is attached to the piston of the load brake cylinder device and through which the push rod 151 is free to move relative to the load piston and piston rod when the load piston and piston rod are in release position. When in effecting a load application of the brakes fluid under pressure is supplied to the empty brake cylinder device said device functions to actuate the brake cylinder lever to cause the slack in the brake rigging to be taken up and to cause the push rod of the load brake cylinder device to be moved outwardly relative to the piston rod and piston. After the slack in the rigging has been taken up, fluid under pressure is supplied to the load brake cylinder device and as the piston and piston rod of this device moves out under the influence of the pressure of fluid supplied thereto the latch mechanism 152 engages the push rod 151, so that movement of the piston of the load brake cylinder device now acts on the brake cylinder lever to add the force of the load brake cylinder device to that of the empty brake cylinder device.

It will be understood from the foregoing description that the empty brake cylinder pressure will be increased to about twenty pounds before fluid under pressure is admitted to the load brake cylinder. The purpose of this is to take up slack in the brake rigging with the empty brake cylinder and thereby limit the piston travel of the load brake cylinder to such an extent that the combined volumes of the two brake cylinders will equal the volume of the 10" brake cylinder used in the "AB" single capacity equipment. This provides for the development of the proper brake cylinder pressure for a given brake pipe reduction.

*Release of the brakes with the equipment conditioned for loaded car operation*

When it is desired to release the brakes with the equipment conditioned for loaded operation the brake pipe pressure is increased which causes the several parts of the brake controlling valve device 2 to move to release position, and with the brake controlling valve device in this position fluid under pressure flows from the load brake cylinder 10 to the atmosphere by way of pipe and passage 130, cavity 145 in the change-over slide valve 26, passages 87 and 86, chambers 85 and 83, passages 84 and 52, and pipe 53 which latter pipe is connected through the medium of the brake controlling valve device 2 to the exhaust pipe 131. When, due to such flow, the load brake cylinder pressure present in chamber 83 and in the valve chamber 94 which is connected through the passage 95 to the chamber 83, is reduced about seven pounds below the empty brake cylinder pressure in valve chamber 88, the pressure of fluid in chamber 88, acting on one side of the valve 73, causes the valve to move, against the opposing pressure of the spring 96, out of engagement with the seat rib 97. Fluid under pressure now flows from the chamber 88 and consequently from the empty brake cylinder 9 to the atmosphere past the valve 97, through chamber 94, passage 95 and chamber 83 which is connected to the atmosphere in the manner just described. Since fluid under pressure from the load brake cylinder continues to be released by way of chamber 83 it will be seen that the brake cylinder reduction continues with the load brake cylinder about seven pounds lower than empty brake cylinder pressure. Now, when the brake cylinder pressure in chamber 83 has been reduced to between five and eight pounds, the spring 82 acts to move the valve piston 71 to the position in which the gasket 74 engages the seat rib 75 and thereby cuts off the flow of fluid from the load brake cylinder to the chamber 83. The valve piston as it is thus moved, acting through the medium of the plunger 91, causes the valve 88 to be moved out of engagement with the seat rib 75, thus connecting the valve chamber 88 and consequently the empty brake cylinder to the chamber 83. With the gasket 74 in engagement with the seat rib 75 and the valve 72 unseated, the pressures in chambers 83 and 94 equalize and the spring 96 acts to seat the valve 73 on the seat rib 97.

At substantially the same time as the gasket 74 is moved into engagement with the seat rib 75 the valve piston 71 uncovers the passage 86 to the chamber 78, so that fluid under pressure is now vented to the atmosphere by way of passage 86, chamber 78, passages 79 and 80, change-over slide valve chamber 27 and passage 28. It will be noted that when the gasket 74 is moved into sealing engagement with the seat rib 75 the final flow of fluid from the empty brake cylinder 9 by way of the brake controlling valve device 2, and from the load brake cylinder 10 by way of the change-over control valve device. This final flow of fluid from the empty brake cylinder 9 will be at the usual release rate as governed by the usual exhaust choke of the retaining valve device and the final flow of fluid from the load brake cylinder 10 will be at a faster rate.

The purpose of providing for the final release of fluid under pressure from the load brake cylinder 10 at a faster rate than that at which fluid is released from the empty brake cylinder 9 is to insure the movement of the piston and piston rod of the load brake cylinder to release position and the consequent movement of the latch mechanism out of locking engagement with the push rod before the empty brake cylinder 9 is entirely depleted of fluid under pressure and thereby effectively prevent the empty brake cylinder from acting to place unnecessary strain on the latch mechanism before the latch of the mechanism is moved out of locking engagement with the push rod of the load brake cylinder.

It will be noted from the foregoing description that in effecting the release of the brakes with the equipment conditioned for loaded car operations, the valve piston 71 maintains the connection between the empty and load brake cylinders open until the load brake cylinder pressure has been reduced to between five and eight pounds. By reason of this the proper release of the brakes are insured in cycling the brakes when the retaining valve devices are set to maintain a minimum brake cylinder pressure of ten pounds.

When a car in which a fluid pressure brake equipment embodying the invention is placed in a train in which the fluid pressure brake equipments on the cars are charged with fluid under pressure, the increase in fluid pressure in the uncharged brake equipment will naturally be at a very rapid rate, and if it were not for the chokes 123 and 126 a correspondingly rapid rate of flow of fluid to the slide valve chamber 63 of the change-over control valve device 21 would occur, thus the flow of fluid to the valve chamber might cause a sufficient fluid pressure to be built up in this chamber as to cause the device 21 to function to connect the passage 35 and consequently the piston valve chamber 34 and the piston chamber 105 of the strut cylinder mechanism to the atmosphere before there is sufficient fluid pressure in the chambers 34 and 105 to effect the change-over action of the apparatus. It will therefore be seen that the purpose of the chokes 123 and 126 is to so retard the flow of fluid from the brake pipe to the valve chamber 63 as to prevent the premature build up of a fluid pressure of sufficient magnitude as to cause the accidental operation of the change-over control valve device to a position to render the change-over apparatus ineffective.

While one illustrative embodiment of our invention has been described in detail, it is not our intention to limit its scope to that embodiment or otherwise than by the terms of the appended claims.

Having now described our invention, what we claim as new and desire to secure by Letters Patent, is:

1. In an empty and load brake equipment for a vehicle, in combination, means operative at one time to produce a certain degree of braking and operative at another time to produce a higher degree of braking, mechanism having two control positions for controlling the operation of said means, locking means for locking said mechanism in either one of said control positions, means for moving said locking means to its unlocking position and operative to at one time effect the operation of said mechanism to one of said control positions, and means operative according to the weight of the load carried by the vehicle for at one time effecting the operation of said mechanism to the other of said control positions and for at another time conditioning the mechanism for control by the means for effecting the operation of the locking means.

2. In an empty and load brake equipment for a vehicle, in combination, means automatically operative at one time to produce a certain degree of braking and at another time to produce a higher degree of braking, a change-over device movable to one or another of two control positions for conditioning said means for operation, means operative according to the weight of the lading carried by the vehicle for controlling the operation of the change-over device, means normally locking the change-over device against movement and fluid pressure controlled means operative automatically to first effect the operation of the locking means to unlock the change-over device to permit said device to assume one of said control positions and to then effect the operation of the locking means to lock the change-over device in the control position which it has assumed.

3. In an empty and load brake equipment for a vehicle, in combination, means automatically operative at one time to produce a certain degree of braking and at another time to produce a higher degree of braking, a change-over device movable to one or another of two control positions for conditioning said means for operation, means operative according to the weight of the lading carried by the vehicle for controlling the operation of the change-over device, means normally locking the change-over device against movement and operative automatically to first unlock the change-over device to permit said device to assume one of said control positions and to then lock the change-over device in the control position which it has assumed, and fluid pressure controlled automatically operative means for controlling the locking movement of the locking means.

4. In an empty and load fluid pressure brake equipment for a vehicle, in combination, a brake pipe, means automatically operative at one time to produce a certain degree of braking and at another time to produce a higher degree of braking, a change-over device movable to one or another of two control positions for conditioning said means for operation, means operative according to the weight of the lading carried by the vehicle for controlling the operation of the change-over device, means normally locking the change-over device against movement and operative upon a predetermined increase in brake pipe pressure to unlock the change-over device, and means operative upon a predetermined greater increase in brake pipe pressure for effecting the operation of the locking means to again lock the change-over device against movement.

5. In an empty and load fluid pressure brake equipment for a vehicle, in combination, a brake pipe, means automatically operative at one time to produce a certain degree of braking and at another time to produce a higher degree of braking, a change-over device movable to one or another of two control positions for conditioning said means for operation, means operative according to the weight of the lading carried by the vehicle for controlling the operation of the change-over device, means normally locking the change-over device against movement and operative upon a predetermined increase in brake pipe pressure to unlock the change-over device, and valve means subject to a substantially fixed pressure and the opposing pressure of fluid supplied from the brake pipe and operative upon an increase in brake pipe pressure in excess of the pressure required to effect the operation of the locking means to its unlocking position to effect the operation of the locking means to its locking position.

6. In an empty and load fluid pressure brake equipment for a vehicle, in combination, a brake pipe, apparatus adapted to be adjusted to one position for operation to effect a certain degree of braking and to another position for operation to effect a higher degree of braking, means operative according to the weight of the lading carried by the vehicle for automatically effecting the adjustment of said apparatus to one or the other of said positions, means normally opposing the adjustment of said apparatus and operative upon a predetermined increase in brake pipe pressure in charging the equipment with fluid under pressure for moving the opposing means out of opposing relationship with the apparatus, and means subject to brake pipe pressure operative upon a predetermined increase in brake pipe pressure in excess of the pressure required to operate the opposing means, to effect the operation of the opposing means to oppose the operation of the apparatus out of its adjusted position.

7. In an empty and load fluid pressure brake equipment for a vehicle, in combination, a brake pipe, apparatus adapted to be adjusted to one position for operation to effect a certain degree of braking and to another position for operation to effect a higher degree of braking, means operative according to the weight of the lading carried by the vehicle for automatically effecting the adjustment of said apparatus to one or the other of said positions, means normally opposing the adjustment of said apparatus and operative upon a predetermined increase in brake pipe pressure in charging the equipment with fluid under pressure for moving the opposing means out of opposing relationship with the apparatus, means subject to brake pipe pressure operative upon a predetermined increase in brake pipe pressure in excess of the pressure required to operate the opposing means, to effect the operation of the opposing means to oppose the operation of the apparatus out of its adjusted position, and means for retarding the rate of flow of fluid from the brake pipe to the second mentioned means.

8. In an empty and load fluid pressure brake equipment for a vehicle, in combination, a brake pipe, apparatus adapted to be adjusted to one position for operation to effect a certain degree of braking and to another position for operation to effect a higher degree of braking, means operative according to the weight of the lading carried by the vehicle for automatically effecting the adjustment of said apparatus to one or the other of said positions, means normally opposing the adjustment of said apparatus and operative upon a predetermined increase in brake pipe pressure in charging the equipment with fluid under pressure for moving the opposing means out of opposing relationship with the apparatus, means subject to brake pipe pressure operative upon a predetermined increase in brake pipe pressure in excess of the pressure required to operate the opposing means, to effect the operation of the opposing means to oppose the operation of the apparatus out of its adjusted position, and choke means for regulating the flow of fluid from the brake pipe to the second mentioned means to such a rate as to insure against the premature operation of the second mentioned means.

9. In an empty and load fluid pressure brake equipment for a vehicle, in combination, an empty brake cylinder, a load brake cylinder, valve means adapted to be conditioned to supply fluid under pressure either to the empty brake cylinder for light load braking or to both the empty and load brake cylinders for heavy load braking, a valve operative to one position for conditioning the valve means for light load braking and operative to another position for conditioning the valve means for heavy load braking, said valve in said other position establishing communication through which fluid under pressure supplied by said valve means flows to the load brake cylinder, fluid under pressure flowing through said communication tending to move said valve out of engagement with its seat, and means subject to brake cylinder pressure for maintaining said valve in close engagement with its seat.

10. In an empty and load fluid pressure brake equipment for a vehicle, in combination, an empty brake cylinder, a load brake cylinder, valve means adapted to be conditioned to supply fluid under pressure either to the empty brake cylinder for light load braking or to both the empty and load brake cylinders for heavy load braking, valve mechanism operative to one position to condition the valve means for light load braking and operative to another position to condition the mechanism for heavy load braking, means operative according to the weight of the lading carried by the vehicle for effecting the operation of said valve mechanism, latch means automatically operative to lock said valve mechanism in either of its conditioning positions, and means operative independently of the valve mechanism for actuating said latch means.

11. In an empty and load fluid pressure brake equipment for a vehicle, in combination, an empty brake cylinder, a load brake cylinder, valve means adapted to be conditioned to supply fluid under pressure either to the empty brake cylinder for light load braking or to both the empty and load brake cylinders for heavy load braking, valve mechanism operative to one position to condition the valve means for light load braking and operative to another position to condition the mechanism for heavy load braking, means operative according to the weight of the lading carried by the vehicle for effecting the operation of said valve mechanism, and a locking mechanism controlled by fluid under pressure and independently of the valve mechanism and operative after the valve mechanism has been moved to one of its conditioning positions for locking the valve mechanism in said position.

12. In an empty and load fluid pressure brake equipment, in combination, a brake pipe, an empty brake cylinder, a load brake cylinder, a brake controlling valve device operative upon a reduction in brake pipe pressure to supply fluid under pressure to effect an application of the brakes, an empty and load change-over mechanism conditioned by fluid under pressure from the brake pipe in initially charging the brake pipe and according to the weight of the lading to supply fluid under pressure to either the empty brake cylinder or both brake cylinders, a member removably secured to the brake controlling valve device having a control communication connecting the brake pipe to the usual control communication of the brake controlling valve device and having a branch control communication connecting the brake pipe to the change-over valve mechanism, and means in said branch communication for restricting the rate of flow of fluid through the branch communication.

13. In an empty and load fluid pressure brake equipment, in combination, a brake pipe, an empty brake cylinder, a load brake cylinder, a brake controlling valve device operative upon a reduction in brake pipe pressure to supply fluid under pressure to effect an application of the brakes, an empty and load change-over mechanism conditioned by fluid under pressure from the brake pipe in initially charging the brake pipe and according to the weight of the lading to supply fluid under pressure to either the empty brake cylinder or both brake cylinders, a member removably secured to the brake controlling valve device having a control communication connecting the brake pipe to the usual control communication of the brake controlling valve device and having a branch control communication connecting the brake pipe to the change-over valve mechanism, means in said branch communication for cleansing fluid flowing through said branch control communication and means in the branch communication for restricting the rate of flow of fluid therethrough to the change-over valve mechanism.

14. In an empty and load fluid pressure brake equipment for a vehicle, in combination, a brake pipe, a brake controlling valve device operative upon a reduction in brake pipe pressure to supply fluid under pressure to effect an application of the brakes, valve means conditioned by fluid under pressure from the brake pipe in charging the equipment and according to the weight of the lading carried by the vehicle to control the flow of fluid supplied by the brake controlling valve device for either light or heavy braking, and a change-over slide valve included in said valve means operative to one change-over position for light braking and to another position for heavy braking, said slide valve being normally subject on opposite sides to fluid at atmospheric pressure and when an application of the brakes is being effected being subjected on its face side to the pressure of fluid supplied by the brake controlling valve device and on the other side to a greater pressure.

15. In an empty and load fluid pressure brake equipment for a vehicle, in combination, a brake pipe, a brake controlling valve device operative upon a reduction in brake pipe pressure to supply fluid under pressure to effect an application of the brakes, valve means conditioned by fluid under pressure from the brake pipe in charging the equipment and according to the weight of the lading carried by the vehicle to control the flow of fluid supplied by the brake controlling valve device for either light or heavy braking, a change-over slide valve included in said valve means operative to one change-over position for light braking and to another position for heavy braking, said slide valve being normally subject on opposite sides to fluid at atmospheric pressure and when an application of the brakes is being effected being subjected on its face side to the pressure of fluid supplied by the brake controlling valve device, and means subject to the pressure of fluid supplied by the brake controlling valve device for maintaining said slide valve against movement by the pressure of fluid acting on its face side.

16. In an empty and load fluid pressure brake equipment for a vehicle, in combination, a brake pipe, a brake controlling valve device operative upon a reduction in brake pipe pressure to supply fluid under pressure to effect an application of the brakes, valve means conditioned by fluid under pressure from the brake pipe in charging the equipment and according to the weight of the lading carried by the vehicle to control the flow of fluid supplied by the brake controlling valve device for either light or heavy braking, a change-over slide valve included in said valve means operative to one change-over position for light braking and to another position for heavy braking, said slide valve being normally subject on opposite sides to fluid at atmospheric pressure and when an application of the brakes is being effected being subjected on its face side to the pressure of fluid supplied by the brake controlling valve device, a strut engaging the back of said slide valve, and means subject to the pressure of fluid supplied by the brake controlling valve device acting through the medium of said strut to maintain said slide valve against movement by the fluid pressure acting on its face.

17. In an empty and load fluid pressure brake equipment for a vehicle, in combination, a brake pipe, a brake controlling valve device operative upon a reduction in brake pipe pressure to supply fluid under pressure to effect an application of the brakes, valve means conditioned by fluid under pressure from the brake pipe in charging the equipment and according to the weight of the lading carried by the vehicle to control the flow of fluid supplied by the brake controlling valve device for either light or heavy braking, a change-over slide valve included in said valve means operative to one change-over position for light braking and to another position for heavy braking, said slide valve being normally subject on opposite sides to fluid at atmospheric pressure and when an application of the brakes is being effected being subjected on its face side to the pressure of fluid supplied by the brake controlling valve device, a strut engaging the back of said slide valve, and a flexible diaphragm operatively engaging said strut operable by fluid under pressure supplied by the brake controlling valve device to transmit through said strut to the back of said slide valve a seating pressure in excess of the pressure of fluid acting on the face of the slide valve.

18. In a car load brake apparatus, in combination, an empty brake cylinder, a load brake cylinder, a spring, valve means subject to the opposing pressures of the empty brake cylinder and said spring for controlling communication through which fluid under pressure is supplied to the load brake cylinder, and means operative with the car loaded for connecting the spring side of said valve means with the atmosphere.

19. In a car load brake apparatus, in combination, an empty brake cylinder, a load brake cylinder, a spring, valve means subject to the opposing pressures of the empty brake cylinder and said spring for controlling communication through which fluid under pressure is supplied to the load brake cylinder, and means operative with the car loaded for connecting the spring side of said valve means with the atmosphere and with the car empty for connecting the spring side of the valve means with the opposite side.

20. In a car load brake apparatus, in combination, an empty brake cylinder, a load brake cylinder, a spring valve means subject to the opposing pressures of the empty brake cylinder and said spring for controlling communication through which fluid under pressure is supplied to the load brake cylinder, and means operative with the car loaded for connecting the spring side of said valve means with the atmosphere, whereby upon a predetermined increase in empty brake cylinder pressure said valve means operates to establish said communication.

21. In a car load brake apparatus, in combination, an empty brake cylinder, a load brake cylinder, a spring, valve means subject to the opposing pressures of the empty brake cylinder and said spring for controlling communication through which fluid under pressure is supplied to the load brake cylinder, means operative with the car loaded for connecting the spring side of said valve means with the atmosphere, and a volume reservoir connected to the spring side of said valve means.

22. In a car load brake apparatus, in combination, an empty brake cylinder, a load brake cylinder, a spring, valve means subject to the opposing pressures of the empty brake cylinder and said spring for controlling communication through which fluid under pressure is supplied to the load brake cylinder, a change-over valve device movable to load position in which communication is established through which fluid under pressure is supplied to the load brake cylinder and in which the spring side of said valve means is connected to the atmosphere, and means operative with the car loaded for effecting the movement of said change-over valve device to load position.

23. In a car load brake apparatus, in combination, an empty brake cylinder, a load brake cylinder, a normally open valve past which fluid under pressure is adapted to be supplied to the empty brake cylinder, and valve means operative upon a predetermined increase in empty brake cylinder pressure for establishing communication through which fluid under pressure is adapted to flow to the load brake cylinder and to effect the closing of said valve to prevent back flow of fluid under pressure from the empty brake cylinder to the load brake cylinder, said valve being ineffective to prevent the flow of fluid to the empty brake cylinder when the load brake cylinder pressure is in excess of empty brake cylinder pressure.

24. In a car load brake apparatus, in combination, an empty brake cylinder, a load brake cylinder, a normally open valve past which fluid under pressure is adapted to be supplied to the empty brake cylinder, valve means operative upon a predetermined increase in empty brake cylinder pressure for establishing communication through which fluid under pressure is adapted to flow to the load brake cylinder and to effect the closing of said valve to prevent back flow of fluid under pressure from the empty brake cylinder to the load brake cylinder, said valve being ineffective to prevent the flow of fluid to the empty brake cylinder when the load brake cylinder pressure is in excess of empty brake cylinder pressure, and a valve subject to the opposing pressures of the load brake cylinder and empty brake cylinder operative upon a predetermined reduction in load brake cylinder pressure in releasing the brakes to establish a communication through which fluid under pressure is vented from the empty brake cylinder so as to maintain the difference between the reducing brake cylinder pressures.

25. In a car load brake apparatus, in combination, an empty brake cylinder, a load brake cylinder, a normally open valve past which fluid under pressure is adapted to be supplied to the empty brake cylinder, valve means operative upon a predetermined increase in empty brake cylinder pressure for establishing communication through which fluid under pressure is adapted to flow to the load brake cylinder and to effect the closing of said valve to prevent back flow of fluid under pressure from the empty brake cylinder to the load brake cylinder, said valve being ineffective to prevent the flow of fluid to the empty brake cylinder when the load brake cylinder pressure is in excess of empty brake cylinder pressure, a spring, and a valve subject on one side to the pressure of the load brake cylinder and of said spring and on the other side to the opposing pressure of the empty brake cylinder and operative upon a predetermined reduction in load brake cylinder pressure in releasing the brakes to vent fluid under pressure from the empty brake cylinder so as to maintain the difference between the reducing brake cylinder pressures.

26. In a car load brake apparatus, in combination, an empty brake cylinder, a load brake cylinder, a normally open valve past which fluid under pressure is adapted to be supplied to the empty brake cylinder, valve means operative upon a predetermined increase in empty brake cylinder pressure for establishing communication through which fluid under pressure is adapted to flow to the load brake cylinder and to effect the closing of said valve to prevent back flow of fluid under pressure from the empty brake cylinder to the load brake cylinder, said valve being ineffective to prevent the flow of fluid to the empty brake cylinder when the load brake cylinder pressure is in excess of empty brake cylinder pressure, and means operative automatically after the load brake cylinder pressure has been reduced a predetermined amount in releasing the brakes for reducing the empty brake cylinder pressure so as to maintain the difference between the reducing brake cylinder pressures.

27. In a car load brake apparatus, in combination, an empty brake cylinder, a load brake cylinder, a normally open valve past which fluid under pressure is adapted to be supplied to the empty brake cylinder, valve means operative upon a predetermined increase in empty brake cylinder pressure for establishing communication through which fluid under pressure is adapted to flow to the load brake cylinder and to effect the closing of said valve to prevent back flow of fluid under pressure from the empty brake cylinder to the load brake cylinder, said valve being ineffective to prevent the flow of fluid to the empty brake cylinder when the load brake cylinder pressure is in excess of empty brake cylinder pressure, and means operative automatically after the load brake cylinder pressure has been reduced a predetermined amount in releasing the brakes for reducing the empty brake cylinder pressure so as to maintain the difference between the reducing brake cylinder pressures, said valve means being operative upon a further decrease in load brake cylinder pressure for venting fluid under pressure from the load brake cylinder at a rate in excess of the rate of reduction in empty brake cylinder pressure.

28. In a car load brake apparatus, in combination, an empty brake cylinder, a load brake cylinder, a normally open valve past which fluid under pressure is adapted to be supplied to the empty brake cylinder, valve means operative upon a predetermined increase in empty brake cylinder pressure for establishing communication through which fluid under pressure is adapted to flow to the load brake cylinder and to effect the closing of said valve to prevent back flow of fluid under pressure from the empty brake cylinder to the load brake cylinder, said valve being ineffective to prevent the flow of fluid to the empty brake cylinder when the load brake cylinder pressure is in excess of empty brake cylinder pressure, and means operative upon a predetermined reduction in load brake cylinder pressure for venting fluid under pressure from the empty brake cylinder to the same communication through which the reduction in load brake cylinder pressure is effected.

29. In a car load brake apparatus, in combination, an empty brake cylinder, a load brake cylinder, a normally open valve past which fluid under pressure is adapted to be supplied to the empty brake cylinder, valve means operative upon a predetermined increase in empty brake cylinder pressure for establishing communication through which fluid under pressure is adapted to flow to the load brake cylinder and to effect the closing of said valve to prevent back flow of fluid under pressure from the empty brake cylinder to the load brake cylinder, said valve being ineffective to prevent the flow of fluid to the empty brake cylinder when the load brake cylinder pressure is in excess of empty brake cylinder pressure, and means operative upon a predetermined reduction in load brake cylinder pressure for venting fluid under pressure from the empty brake cylinder to the same communication through which the load brake cylinder pressure is effected, said valve means being operative upon a further reduction in load brake cylinder pressure for continuing the venting of fluid under pressure from the empty brake cylinder by way of said communication and for establishing a communication through which fluid under pressure is vented from the load brake cylinder at a faster rate than that at which fluid under pressure is being vented from the empty brake cylinder.

30. In a car load brake apparatus, a brake pipe, valve means operative to establish communication for effecting either empty or loaded car braking, and means operative upon a predetermined increase in brake pipe pressure and independently of the operation of said valve means for holding the valve means against movement.

31. In a car load brake apparatus, a brake pipe, valve means operative to establish communication for effecting either empty or loaded car braking, and means operative upon a predetermined increase in brake pipe pressure and independently of the operation of said valve means for holding the valve means against movement from one position to another position.

32. In a car load brake apparatus, a brake pipe, valve means having different positions in which either empty or loaded car braking is effected, and means operative upon a predetermined increase in brake pipe pressure and independently of the operation of said valve means for locking the valve means against movement from one position to another position.

33. In a car load brake apparatus, a brake pipe, valve means adapted to be adjusted to different positions for either empty or loaded car braking, and means operative upon a predetermined increase in brake pipe pressure and independently of the operation of said valve means for locking the valve means against movement from its adjusted position.

34. In a car load brake apparatus, a brake pipe, valve means adapted to be adjusted to different positions for either empty or loaded car braking, and means operative upon a predetermined increase in brake pipe pressure separately from said valve means for locking the valve means against movement from the position in which the valve means is found.

35. In a car load brake apparatus, a brake pipe, valve means operative to establish communication for effecting either empty or loaded car braking, and means normally holding said valve means against movement and operative upon a predetermined increase in brake pipe pressure out of contact with said valve means for freeing the valve means of holding action and operative upon a further increase in brake pipe pressure into holding relationship with the valve means.

36. In a car load brake apparatus, in combination, a brake pipe, valve means operative between two positions to condition the brake apparatus for either empty or loaded car braking, and means operative upon a predetermined increase in brake pipe pressure and independently of the operation of said valve means for holding the valve means against movement from at least one position to the other.

37. In a car load brake apparatus, in combination, a brake pipe, valve means adapted to be adjusted to different positions for either empty or loaded car braking, and means operative upon a predetermined increase in brake pipe pressure separately from said valve means for locking the valve means against movement from at least one position to the other.

38. In a car load brake apparatus, in combination, a brake pipe, valve means adapted to be adjusted to different positions for either empty or loaded car braking, and means operative upon a predetermined increase in brake pipe pressure independently of operation of said valve means for locking the valve means against movement from at least the loaded car braking position.

39. In a fluid pressure empty and load vehicle brake apparatus, in combination, a brake pipe, valve means movable between two positions in one of which the brake system is conditioned for braking to a relatively low degree and in the other of which the brake system is conditioned for braking to a relatively high degree, locking means operable upon supply of fluid under pressure thereto to permit movement of said valve means from one of said two positions to the other and operable upon release of fluid under pressure therefrom to mechanically hold said valve means against movement from said one position to the other, and means controlled by brake pipe pressure for controlling the supply of fluid under pressure to and its release from said locking means.

40. In a fluid pressure empty and load vehicle brake apparatus, in combination, a brake pipe, valve means movable between two positions in one of which the brake system is conditioned for braking to a relatively low degree and in the other of which the brake system is conditioned for braking to a relatively high degree, locking means having a movable abutment subject on one side to spring pressure and on the other side to fluid pressure in a chamber for mechanically controlling movement of the valve means, and means controlled by fluid pressure in the brake pipe for controlling supply of fluid under pressure to and its release from said chamber.

41. In a fluid pressure empty and load vehicle brake system, in combination, a brake pipe, a device having an empty position and a load position, means for locking the device in at least the load position, and means operated upon a predetermined increase in brake pipe pressure and independently of operation of said device for causing said means to lock said device in at least the load position.

EARLE S. COOK.
ELLIS E. HEWITT.